Patented Feb. 18, 1941

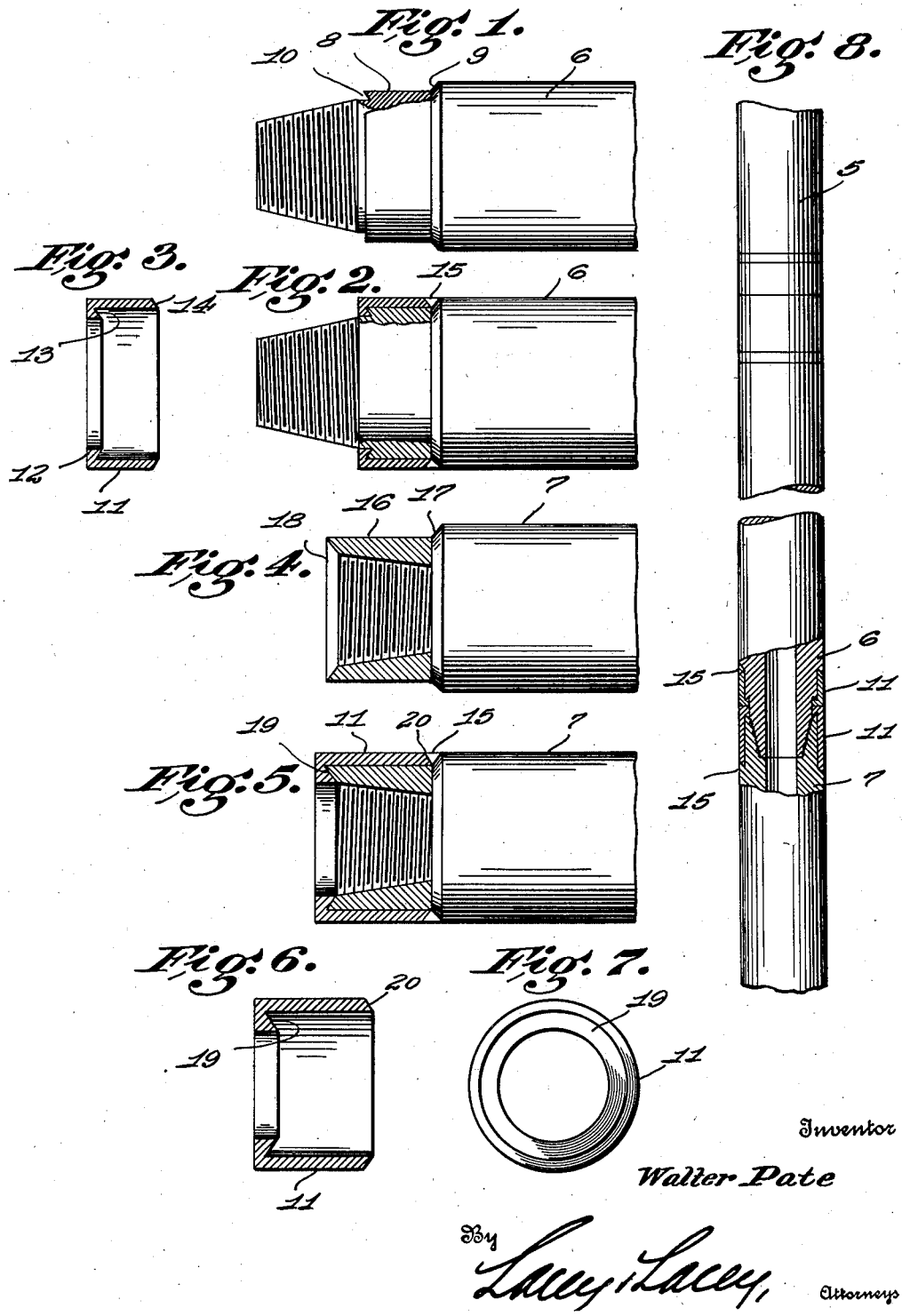

2,232,135

UNITED STATES PATENT OFFICE 2,232,135

REPLACEMENT BEARING SLEEVE FOR THE COUPLINGS OF DRILL STEMS

Walter Pate, Smackover, Ark.

Application February 6, 1940, Serial No. 317,613

2 Claims. (Cl. 285—146)

This invention relates to oil drilling apparatus and more particularly to a novel form of facing ring or sleeve for use on the connecting joints of drill stems.

It is a well-known fact that the pipe sections of oil well drill stems, and particularly the connecting joints thereof, are subjected to constant strain and wear incident to drilling operations, which excessive wear and strain often necessitate cutting off the threaded ends of the pipe sections at the connecting joints and replacing the threaded ends with new couplings. The frequent replacement of couplings is not only expensive and time-consuming but requires shutting down drilling operations while such repairs are being effected.

The object of the present invention is to overcome these difficulties by the employment of a replacement ring or facing sleeve which can be quickly and conveniently fitted over the worn portion of a coupling so as to permit continued use of the original coupling for an indefinite period.

A further object is to provide a replacement ring, one end of which is provided with a terminal flange having a beveled or undercut face for engagement with a correspondingly beveled portion on a male or female coupling member and the other end thereof formed with a circumferential welding channel for securing the ring in position on said coupling member.

A further object is to provide a replacement ring, the construction of which is such that by severing or cutting away the welding material the ring may be readily removed when worn and a new facing ring quickly fitted in place.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a side elevation of a male drill stem coupling showing the construction of the reduced portion for engagement with the facing or replacement sleeve, Figure 2 is a similar view showing the facing sleeve in position on the reduced portion of the coupling, Figure 3 is a vertical sectional view showing the facing or replacement sleeve detached, Figure 4 is a side elevation, partly in section, of a female coupling member having its end reduced to receive a replacement sleeve, Figure 5 is a similar view showing the replacement or facing sleeve in position on the female coupling member, Figure 6 is a vertical sectional view of the facing sleeve for the female coupling member detached, Figure 7 is an end view of Figure 6, and Figure 8 is a side elevation, partly in section, showing several of the coupling members connected to form a drill stem.

The improved replacement or facing sleeve forming the subject-matter of the present invention is principally designed for use in connection with the coupling joints of oil well drill stems, and in Figure 8 of the drawing, there is shown a conventional drill stem, in which 5 designates the pipe sections, each provided with a male coupling member 6 for detachable engagement with a female coupling member 7 on the adjacent pipe section. Each male coupling member 6 is provided with an annular reduced portion 8 defining a beveled face 9, and the outer end of the annular portion 8 is undercut to form a beveled seat 10, as best shown in Figure 1 of the drawing.

Removably fitted over the reduced annular portion 8 is a replacement or facing sleeve 11, the purpose of which is to receive the wear and strain on the coupling member incident to drilling operations. The facing sleeve 11 is formed with an inwardly extending flange 12 having an undercut or beveled face 13 which contacts with the beveled face 10 on the coupling member and serves to receive the thrust of the facing sleeve and also to prevent the entrance of dirt and other foreign matter between the facing sleeve and reduced portion of the coupling. The inner end of the facing sleeve 11 is beveled, at 14, and coacts with the beveled edge 9 of the coupling 6 to form a circumferential channel adapted to receive suitable welding material, indicated at 15, for the purpose of holding the sleeve securely in position on the coupling member. The female coupling member 7 is also provided with a reduced annular portion 16 defining a beveled edge 17, and the free end of the threaded portion of the female coupling is inclined or beveled, at 18, for engagement with the correspondingly beveled portion 19 on the facing sleeve 11 of the female coupling member, as best shown in Figure 5 of the drawing. The sleeve 11 used in connection with the female coupling member is likewise provided with a beveled portion 20 which coacts with the beveled portion 17 on the female coupling member to accommodate the welding material 15.

The replacement or facing sleeves may be used in connection with either old coupling joints or new joints, in which latter case the facing sleeves will be embodied in the coupling members during the manufacture thereof. When the usual coupling members are employed and said coupling members become worn or damaged from constant wear and vibration on the drill stem, it is necessary to cut off the coupling members of the pipe sections and replace the same by new coupling members, thereby necessitating shutting down drilling operations while such repairs are being effected. By the use of my improved facing sleeve, should one of the old type coupling members become excessively worn or otherwise unfit for further service, it is merely necessary to cut away the worn surface of the coupling to form the annular reduced portion 8 and to fit one of the improved replacement or facing sleeves thereover and in which position it will be securely fastened by welding the parts together at the V-shaped welding channel, thereby materially increasing the effective life of the coupling. When the facing sleeves are built into the couplings during the manufacture thereof and said sleeves become worn from constant use, they may be readily removed by cutting away the welding material 15 and sliding the sleeve longitudinally out of engagement with the reduced portion 8, after which a new facing sleeve may be quickly fitted thereon and welded in position, as previously stated.

It will, of course, be understood that the replacement or facing sleeves may be made in different sizes and shapes and constructed of any suitable material without departing from the spirit of the invention.

It will also be understood that the facing sleeves may be used in connection with any type of coupling, the salient feature of the invention residing in a replacement sleeve which may be quickly applied to worn surfaces of coupling members to increase the effective life of said coupling members.

Having thus described the invention, what is claimed as new is:

1. A coupling for drill stems of oil wells including interengaging male and female members each provided with an annular reduced portion defining a circumferential edge and an undercut portion spaced therefrom, and facing sleeves removably fitted to said reduced portions, one end of each facing sleeve being undercut for engagement with the undercut portion on the adjacent member and the other end thereof provided with a circumferential edge coacting with the circumferential edge of said member to form a channel for the reception of securing material.

2. A coupling for drill stems of oil wells including interengaging male and female members each provided with an annular reduced portion defining a circumferentially beveled edge at one end thereof, the other end of the reduced portion being provided with an inclined seat, and facing sleeves removably fitted to said reduced portions and each provided at one end thereof with an inwardly extending flange having an inclined seat for engagement with the inclined seat of the adjacent member and its other end formed with a beveled edge coacting with the beveled edge of said member to form a channel adapted to receive securing material.

WALTER PATE.